(12) United States Patent
Nishiguchi et al.

(10) Patent No.: US 10,703,894 B2
(45) Date of Patent: *Jul. 7, 2020

(54) HEAT-RESISTANT CROSSLINKED RESIN FORMED BODY AND METHOD FOR PRODUCING THE SAME, SILANE MASTER BATCH, MASTER BATCH MIXTURE AND FORMED BODY THEREOF, AND HEAT-RESISTANT PRODUCT

(71) Applicant: FURUKAWA ELECTRIC CO., LTD., Tokyo (JP)

(72) Inventors: Masaki Nishiguchi, Tokyo (JP); Hidekazu Hara, Tokyo (JP); Arifumi Matsumura, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 61 days.

This patent is subject to a terminal disclaimer.

(21) Appl. No.: 16/059,285

(22) Filed: Aug. 9, 2018

(65) Prior Publication Data

US 2018/0346702 A1    Dec. 6, 2018

Related U.S. Application Data

(63) Continuation of application No. PCT/JP2017/004944, filed on Feb. 10, 2017.

(30) Foreign Application Priority Data

Feb. 12, 2016 (JP) .................................. 2016-024489

(51) Int. Cl.
| | | |
|---|---|---|
| *C08L 27/06* | (2006.01) | |
| *C08L 11/00* | (2006.01) | |
| *C08L 15/02* | (2006.01) | |
| *C08K 5/14* | (2006.01) | |
| *C08K 3/22* | (2006.01) | |
| *C08K 3/26* | (2006.01) | |
| *C08K 3/36* | (2006.01) | |
| *C08J 3/00* | (2006.01) | |
| *C08L 27/08* | (2006.01) | |
| *H01B 3/00* | (2006.01) | |
| *C08L 101/04* | (2006.01) | |
| *C08K 5/5419* | (2006.01) | |
| *H01B 3/44* | (2006.01) | |
| *C08L 101/00* | (2006.01) | |
| *C09D 127/06* | (2006.01) | |
| *C08J 3/24* | (2006.01) | |
| *C08K 3/013* | (2018.01) | |
| *H01B 7/29* | (2006.01) | |
| *H01B 7/28* | (2006.01) | |

(52) U.S. Cl.
CPC ............ *C08L 27/06* (2013.01); *C08J 3/005* (2013.01); *C08J 3/247* (2013.01); *C08K 3/013* (2018.01); *C08K 3/2279* (2013.01); *C08K 3/26* (2013.01); *C08K 3/36* (2013.01); *C08K 5/14* (2013.01); *C08K 5/5419* (2013.01); *C08L 11/00* (2013.01); *C08L 15/02* (2013.01); *C08L 27/08* (2013.01); *C08L 101/00* (2013.01); *C08L 101/04* (2013.01); *C09D 127/06* (2013.01); *H01B 3/006* (2013.01); *H01B 3/443* (2013.01); *C08J 2311/00* (2013.01); *C08J 2323/28* (2013.01); *C08K 2003/2224* (2013.01); *C08K 2003/2227* (2013.01); *C08K 2003/265* (2013.01); *C08L 2203/202* (2013.01); *C08L 2310/00* (2013.01); *C08L 2312/08* (2013.01); *H01B 7/28* (2013.01); *H01B 7/29* (2013.01)

(58) Field of Classification Search
CPC .......... H01B 3/006; H01B 3/443; H01B 7/29; H01B 7/28; C08L 101/00; C08L 27/06; C08L 11/00; C08L 15/02; C08L 27/08; C08L 101/04; C08L 2203/265; C08L 2203/202; C08L 2310/00; C08L 2312/08; C08J 3/247; C08J 3/005; C08J 2311/00; C08J 2323/28; C09D 127/06

See application file for complete search history.

(56) References Cited

U.S. PATENT DOCUMENTS

| | | | |
|---|---|---|---|
| 2016/0208060 | A1 | 7/2016 | Nishiguchi et al. |
| 2018/0346664 | A1* | 12/2018 | Nishiguchi .............. C08J 3/247 |
| 2018/0346700 | A1* | 12/2018 | Nishiguchi et al. ... H01B 3/445 |

FOREIGN PATENT DOCUMENTS

| | | |
|---|---|---|
| JP | 60-144315 | 7/1985 |
| JP | 06-168629 | 6/1994 |
| JP | 10-081802 | 3/1998 |
| JP | 2000-143935 | 5/2000 |
| JP | 2000-315424 | 11/2000 |
| JP | 2001-101928 | 4/2001 |
| JP | 2001-240719 | 9/2001 |
| JP | 2008-184613 | 8/2008 |
| JP | 2012-255077 | 12/2012 |

(Continued)

OTHER PUBLICATIONS

International Search Report dated Mar. 28, 2017 in PCT/JP2017/004944 filed Feb. 10, 2017 (with English Translation).

*Primary Examiner* — Nathan M Nutter
(74) *Attorney, Agent, or Firm* — Oblon, McClelland, Maier & Neustadt, L.L.P.

(57) ABSTRACT

A method that has a step (a) of melt-kneading 0.003 to 0.3 part by mass of an organic peroxide, 0.5 to 400 parts by mass of an inorganic filler, and more than 2 parts by mass and 15.0 parts by mass or less of a silane coupling agent, with respect to 100 parts by mass of a resin containing a halogen-containing resin, at a temperature equal to or higher than a decomposition temperature of the organic peroxide, to prepare a silane master batch; a heat-resistant crosslinked resin formed body obtained by the method, a silane master batch, a mixture and a formed body thereof, and a heat-resistant product.

14 Claims, No Drawings

(56) References Cited

FOREIGN PATENT DOCUMENTS

| | | |
|---|---|---|
| JP | 2014-136752 | 7/2014 |
| WO | WO 2013/147148 A1 | 10/2013 |
| WO | WO 2015/046476 A1 | 4/2015 |

* cited by examiner

HEAT-RESISTANT CROSSLINKED RESIN FORMED BODY AND METHOD FOR PRODUCING THE SAME, SILANE MASTER BATCH, MASTER BATCH MIXTURE AND FORMED BODY THEREOF, AND HEAT-RESISTANT PRODUCT

CROSS-REFERENCE TO RELATED APPLICATIONS

This application is a Continuation of PCT International Application No. PCT/JP2017/004944 filed on Feb. 10, 2017, which claims priority under 35 U.S.C. § 119 (a) to Japanese Patent Application No. 2016-024489 filed in Japan on Feb. 12, 2016. Each of the above applications is hereby expressly incorporated by reference, in its entirety, into the present application.

TECHNICAL FIELD

The present invention relates to a heat-resistant crosslinked resin formed body and a method for producing the same, a silane master batch, a master batch mixture and a formed body thereof, and a heat-resistant product.

BACKGROUND ART

Wiring materials such as insulated wires, cables, cords, optical fiber core wires or optical fiber cords (optical fiber cables), used in an electrical and electronic equipment field and an industrial field are required to have various characteristics such as flame retardancy, heat resistance and mechanical characteristics (for example, tensile properties and abrasion resistance).

In addition, these wiring materials are heated to 80 to 105° C., and further to about 125° C., by use for a long period of time, and are required to have heat resistance thereto in several cases. In such a case, a rubber material or a crosslinked material is used as the wiring material. As a method for crosslinking rubber, a chemical crosslinking method is generally employed, and when the crosslinked material is produced, an electron beam crosslinking method or a chemical crosslinking method is employed.

Conventionally, as methods for crosslinking polyolefin resins such as polyethylene, known so far include: electron beam crosslinking methods in which the resin is crosslinked by irradiation with electron beams, and chemical crosslinking methods, such as a crosslinking method in which heat is applied after forming, to decompose organic peroxide or the like and to allow a crosslinking reaction, and a silane crosslinking method.

The silane crosslinking method means a method of obtaining a crosslinked resin, by obtaining a silane-grafted resin by allowing a grafting reaction of a silane coupling agent having an unsaturated group with a resin in the presence of organic peroxide, and then bringing the silane-grafted resin into contact with moisture in the presence of a silanol condensation catalyst.

Among the above-described crosslinking methods, in particular, the silane crosslinking method requires no special facilities in many cases, and therefore can be employed in a wide range of fields.

However, when the silane grafting reaction is performed by using a kneader or a Banbury mixer in the silane crosslinking method, the silane coupling agent having the unsaturated group generally has high volatility and has a problem that it volatilizes before participating in the silane grafting reaction. Therefore, it has been difficult to prepare a desired silane crosslinked master batch containing the silane-grafted resin.

Furthermore, it is more difficult to cause silane crosslinking of a halogen-containing resin such as a polyvinyl chloride resin, chlorinated polyethylene and chloroprene rubber than to cause silane crosslinking of the above-described polyolefin resin, by the silane crosslinking method. It is difficult to produce the crosslinked resin merely by allowing the silane grafting reaction of the silane coupling agent having the unsaturated group with the halogen-containing resin in the presence of organic peroxide, to obtain the silane-grafted resin, and then bringing the silane-grafted resin into contact with moisture in the presence of the silanol condensation catalyst.

To take an example of the silane crosslinking method, for example, Patent Literature 1 proposes a method of sufficiently melt-kneading an inorganic filler subjected to surface treatment with a silane coupling agent, a silane coupling agent, an organic peroxide, and a crosslinking catalyst to a polyolefin-based resin, by a kneader, and then forming the resultant material by a single screw extruder.

In addition, Patent Literatures 2 to 4 propose a method of partially crosslinking a vinyl aromatic thermoplastic elastomer composition prepared by applying a block copolymer or the like as a base polymer and adding a softener for non-aromatic-rubber as the softener thereto, by using an organic peroxide, through an inorganic filler subjected to surface treatment with silane.

Patent Literature 5 proposes a method of obtaining a cable having heat resistance, by adding an organic peroxide, and a silane coupling agent, to a base material, together with an inorganic filler, and further extruding the resultant material together with a silanol condensation catalyst, and then bringing the resultant material into contact with moisture.

CITATION LIST

Patent Literatures

Patent Literature 1: JP-A-2001-101928 ("JP-A" means unexamined published Japanese patent application)
Patent Literature 2: JP-A-2000-143935
Patent Literature 3: JP-A-2000-315424
Patent Literature 4: JP-A-2001-240719
Patent Literature 5: JP-A-2012-255077

SUMMARY OF INVENTION

Technical Problem

In the method described in Patent Literature 1, a resin is crosslinked during melt-kneading by a kneader or the like in several cases. Further, most of a silane coupling agent other than the silane coupling agent applied to surface treatment of an inorganic filler is volatilized or causes condensation with each other in several cases. Therefore, an electric wire having desired heat resistance is unable to be obtained. In addition thereto, outer appearance of the electric wire obtained is deteriorated by a condensation reaction between the silane coupling agents in several cases.

Even according to the methods described in Patent Literatures 2 to 4, the resin does not form sufficient network structures yet, and therefore a bond between the resin and the inorganic filler is easily broken at a high temperature. Accordingly, the formed body obtained may melt under a high temperature, and an insulating material may melt during soldering processing of an electric wire, for example. In addition, the formed body may deform or foam in applying secondary processing to the formed body in several cases. Further, if the formed body is heated to about 200° C. for a short period of time, outer appearance is deteriorated or the formed body is deformed in several cases.

The method described in Patent Literature 5 is provided for solving the above-described problems. However, also in the method described in Patent Literature 5, sufficient crosslinking is not caused or poor outer appearance is caused, in using a halogen-containing resin or rubber material, in several cases.

The present invention aims to solve the above-described problems, and is contemplated for providing a heat-resistant crosslinked resin formed body of a halogen-containing resin or rubber material, in which the formed body is excellent in heat resistance and is not melted even at a high temperature (not particularly limited to, but is preferably 170° C. or higher), and a method for producing the same.

In addition, the present invention is contemplated for providing a silane master batch or a master batch mixture, from which the heat-resistant crosslinked resin formed body can be formed, and a formed body thereof.

Further, the present invention is contemplated for providing a heat-resistant product containing the heat-resistant crosslinked resin formed body obtained according to the production method for the heat-resistant crosslinked resin formed body.

Solution to Problem

The present inventors found that a heat-resistant crosslinked resin formed body which is excellent in heat resistance and is not melted even at a high temperature can be produced according to a specific production method, in which a silane master batch prepared by melt-mixing a halogen-containing resin (including halogen-containing rubber), an inorganic filler, and a silane coupling agent, is mixed with a silanol condensation catalyst, at a specific ratio in a silane crosslinking method. The present inventors have further continued research based on this finding, and have completed the present invention.

That is, the problems of the present invention have been solved by the following means.

<1> A method for producing a heat-resistant crosslinked resin formed body, comprising:

(a) a step of melt-kneading 0.003 to 0.3 part by mass of an organic peroxide, 0.5 to 400 parts by mass of an inorganic filler, and more than 2 parts by mass and 15.0 parts by mass or less of a silane coupling agent, with respect to 100 parts by mass of a resin containing a halogen-containing resin, at a temperature equal to or higher than a decomposition temperature of the organic peroxide, to prepare a silane master batch;

(b) a step of mixing the silane master batch obtained in the step (a) with a silanol condensation catalyst, and then forming the resultant mixture; and (c) a step of bringing the formed body obtained in the step (b) into contact with moisture, to cause crosslinking.

<2> The method for producing the heat-resistant crosslinked resin formed body described in the item <1>, wherein a content of the organic peroxide is 0.005 to 0.1 part by mass.

<3> The method for producing the heat-resistant crosslinked resin formed body described in the item <1> or <2>, wherein a content of the silane coupling agent is 3 to 12.0 parts by mass.

<4> The method for producing the heat-resistant crosslinked resin formed body described in any one of the items <1> to <3>, wherein a content of the silane coupling agent is 4 to 12.0 parts by mass.

<5> The method for producing the heat-resistant crosslinked resin formed body described in any one of the items <1> to <4>, wherein the silane coupling agent is vinyltrimethoxysilane or vinyltriethoxysilane.

<6> The method for producing the heat-resistant crosslinked resin formed body described in any one of the items <1> to <5>, wherein the inorganic filler is silica, aluminum hydroxide, magnesium hydroxide, calcium carbonate or antimony trioxide, or any combination of these.

<7> The method for producing the heat-resistant crosslinked resin formed body described in any one of the items <1> to <6>, wherein melt-kneading in the step (a) is performed by using an enclosed mixer.

<8> A silane master batch for use in producing a master batch mixture prepared by mixing 0.003 to 0.3 part by mass of an organic peroxide, 0.5 to 400 parts by mass of an inorganic filler, and more than 2 parts by mass and 15.0 parts by mass or less of a silane coupling agent, with respect to 100 parts by mass of a resin containing a halogen-containing resin, and a silanol condensation catalyst, wherein the silane master batch is obtained by melt-kneading all or part of the resin; the organic peroxide, the inorganic filler and the silane coupling agent, at a temperature equal to or higher than a decomposition temperature of the organic peroxide.

<9> A master batch mixture, comprising the silane master batch described in the item <8> and a silanol condensation catalyst.

<10> A formed body, formed by introducing the master batch mixture obtained by dry-blending the silane master batch described in the item <8> and a silanol condensation catalyst, into a forming machine.

<11> A heat-resistant crosslinked resin formed body, produced according to the method for producing the heat-resistant crosslinked resin formed body described in any one of the items <1> to <7>.

<12> The heat-resistant crosslinked resin formed body described in the item <11>, formed by crosslinking the halogen-containing resin with the inorganic filler through a silanol bond.

<13> A heat-resistant product, comprising the heat-resistant crosslinked resin formed body described in the item <11> or <12>.

<14> The heat-resistant product described in the item <13>, wherein the heat-resistant crosslinked resin formed body is a coating of an electric wire or an optical fiber cable.

Note that, in this specification, numerical expressions in a style of " . . . to . . . " will be used to indicate a range including the lower and upper limits represented by the numerals given before and after "to", respectively.

Effects of Invention

The present invention can overcome problems of the existing methods described above, and can efficiently produce a heat-resistant crosslinked resin formed body which is excellent in heat resistance and is not melted even at a high temperature, and a heat-resistant product containing the formed body, by mixing an inorganic filler and a silane coupling agent before kneading and/or during kneading with a halogen-containing resin and/or rubber, thereby suppressing volatilization of the silane coupling agent during kneading. Further, even if a large amount of the inorganic filler is added thereto, a high heat-resistant crosslinked resin formed body can be produced without using a special machine such as an electron beam crosslinking machine.

Accordingly, the present invention can provide such a heat-resistant crosslinked resin formed body which is excellent in heat resistance and is not melted even at a high temperature, and a method for producing the same. In addition, the present invention can provide a silane master batch or a master batch mixture, from which the heat-resistant crosslinked resin formed body can be formed, and a formed body thereof. Furthermore, the present invention can provide a heat-resistant product containing the above-described heat-resistant crosslinked resin formed body.

Other and further features and advantages of the invention will appear more fully from the following description.

MODE FOR CARRYING OUT THE INVENTION

First, each component to be used in the present invention will be explained.

<Resin>

A resin for use in the present invention contains a halogen-containing resin which is a resin or rubber containing a halogen atom. Specific examples of the halogen atom include a fluorine atom, a chlorine atom, a bromine atom or an iodine atom, and a fluorine atom or a chlorine atom is preferable. The halogen-containing resin may contain one or two or more kinds of halogen atoms.

The halogen-containing resin is not particularly limited, and an ordinary resin that has been used so far in a halogen-containing resin composition or a halogen-containing rubber composition can be used.

Specific examples of such a halogen-containing resin include a resin or rubber of a polymer having a site capable of a grafting reaction with a grafting reaction site of a silane coupling agent in the presence of an organic peroxide, for example, an unsaturated bond site of a carbon chain, or a carbon atom having a hydrogen atom in a main chain or at a terminal thereof.

Specific examples of the halogen-containing resin include a resin or rubber containing a halogen atom in a main chain or a side chain. Specific examples of the halogen-containing resin include a chlorine-containing resin or rubber containing a chlorine atom, and a fluorocarbon resin or rubber containing a fluorine atom.

In the present invention, when the halogen-containing resin contains two or more kinds of halogen atoms, this halogen-containing resin is categorized in the resin containing the halogen atom and satisfying the following halogen content.

Specific examples of the halogen-containing resin include a resin obtained by (co)polymerizing a monomer containing a halogen atom, a resin obtained by halogenating (ordinarily, chlorinating) a (co)polymer, a resin obtained by further halogenating (ordinarily, chlorinating) a (co)polymer of a monomer containing a halogen atom, or a resin obtained by halogenating a resin containing no halogen by replacing an atom in the resin by a halogen element.

Specific examples of such a halogen-containing resin include a chlorine-containing resin or rubber such as a polyvinyl chloride resin, a chlorinated polyethylene resin, chloroprene rubber, sulfonated chloroprene rubber, a resin or rubber composed of a copolymer of vinyl chloride and vinyl acetate, a resin or rubber composed of a copolymer of vinyl chloride and urethane, and a material having a halogen atom, or a fluorocarbon resin or rubber such as fluorocarbon rubber.

In addition thereto, specific examples thereof include a chlorine-containing resin or rubber such as a copolymer of polyvinyl chloride, polyvinylidene chloride or a copolymer thereof, a copolymer of chlorinated polyethylene, and chlorosulfonated rubber, or a fluorine-containing resin or rubber such as a fluorocarbon resin.

In the present invention, as the chlorine-containing resin or rubber, a chlorinated polyethylene resin, a polyvinyl chloride resin or a copolymer of polyvinyl chloride is preferable.

The fluorocarbon rubber is not particularly limited, and specific examples thereof include tetrafluoroethylene-propylene copolymer rubber (FEPM), tetrafluoroethylene-fluoropropylene (for example, hexafluoropropylene) copolymer rubber, tetrafluoroethylene-perfluorovinyl ether copolymer rubber (FFKM), vinylidene fluoride rubber (FKM, for example, vinylidene fluoride-hexafluoropropylene copolymer rubber), or copolymer rubber between these and chlorine-based rubber, for example, chloroprene.

In the present invention, as the halogen-containing resin, a chlorinated resin or rubber, or a fluorocarbon resin or rubber is preferable, and a chlorinated resin or rubber is further preferable.

In the present invention, specific examples of the halogen-containing resin include an aspect of containing at least one of fluorocarbon rubber and chloroprene, and an aspect of not containing at least one of fluorocarbon rubber and chloroprene.

A content of the halogen atom in the halogen-containing resin (a mass ratio of the halogen atom with regard to the total amount of the halogen-containing resin, referred to as a halogen content) is not particularly limited.

For example, in the case of the chlorine-containing resin or rubber, a chlorine content is preferably 20% by mass or more, more preferably 25% by mass or more, and further preferably 30% by mass or more. In addition, in the case of the fluorine-containing resin or rubber, a fluorine content is preferably 25% by mass or more, more preferably 40% by mass or more, and further preferably 50% by mass or more. An upper limit of the halogen content is a mass ratio when all of atoms of a copolymer or resin before being halogenated, and capable of being replaced by halogen are replaced by halogen, and is unable to be unambiguously determined, as this varies depending on a molecular weight of the copolymer or resin before being halogenated, the number of atoms that can be replaced by halogen, or the like. For example, the upper limit can be taken as 75% by mass.

The chlorine content can be quantitatively determined in accordance with potentiometric titration described in JIS K 7229.

The fluorine content can be determined in accordance with a calculated value during synthesis, or a potassium carbonate pyrohydrolysis method. Specific examples of the potassium carbonate pyrohydrolysis method include the method described in Makoto Noshiro et al., NIPPON KAGAKU KAISHI, 6, 1236 (1973).

In the present invention, as a resin component, the resin may contain, in addition to the halogen-containing resin, any other resin, an oil component or a plasticizer.

In this case, a percentage content of each component is appropriately determined to be 100% by mass in a sum total of each component such as the halogen-containing resin, the other resin, the oil component and the plasticizer, and preferably selected from a value within the following range.

For example, a percentage content of the halogen-containing resin in the resin component is preferably 30 to 100% by mass, and more preferably 50 to 100% by mass. If the percentage content is excessively small, flame retardancy, oil resistance, weather resistance or the like inherent to the halogen-containing resin may not be imparted in several cases.

The other resin is not particularly limited, and specific examples thereof include a thermoplastic elastomer, a polyolefin resin, and the like. In the present invention, a base resin includes an aspect of containing at least one of the thermoplastic elastomer and the polyolefin resin, and an aspect of not containing at least one of the elastomer and the resin.

The oil component is not particularly limited, and specific examples thereof include organic oil or mineral oil.

Specific examples of the organic oil or the mineral oil include soybean oil, paraffin oil and naphthene oil.

A percentage content of the oil is not particularly limited, and when the resin contains the oil, the percentage content is preferably 0 to 75% by mass, and more preferably 0 to 60% by mass, in 100% by mass of the resin. If the content of the oil is excessively large, it can be a cause of bleeding and reduction of strength.

The plasticizer is not particularly limited, and specific examples thereof include various agents ordinarily used in the halogen-containing resin or the halogen-containing rubber. Specific examples thereof include trialkyl trimellitate (C8, C10), a pyromellitic acid ester-based plasticizer, a phthalic acid ester-based plasticizer, an adipic acid ester plasticizer and a polyester-based plasticizer.

A percentage content of the plasticizer is not particularly limited, and when the resin contains the plasticizer, is preferably 0 to 75% by mass, and more preferably 0 to 60% by mass, in 100% by mass of the resin. If the content of the plasticizer is excessively large, it can be a cause of bleeding and reduction of strength.

<Organic Peroxide>

The organic peroxide plays a role of generating a radical at least by thermal decomposition, to cause a grafting reaction due to the radical reaction of the silane coupling agent onto the resin component, as a catalyst. In particular, when the reaction site of the silane coupling agent contains, for example, an ethylenically unsaturated group, the organic peroxide play a role of causing the grafting reaction due to a radical reaction (including an abstraction reaction of a hydrogen radical from the resin component) between the ethylenically unsaturated group and the resin component.

The organic peroxide is not particularly limited, as long as the organic peroxide is one that generates a radical. For example, as the organic peroxide, the compound represented by the formula $R^1$—OO—$R^2$, $R^3$—OO—C(=O)$R^4$, or $R^5$C(=O)—OO(C=O)$R^6$ is preferable. Herein, $R^1$ to $R^6$ each independently represent an alkyl group, an aryl group, or an acyl group. Among $R^1$ to $R^6$ of each compound, it is preferable that all of $R^1$ to $R^6$ be an alkyl group, or any one of them be an alkyl group, and the rest be an acyl group.

Examples of such organic peroxide may include dicumyl peroxide (DCP), di-tert-butyl peroxide, 2,5-dimethyl-2,5-di-(tert-butyl peroxy)hexane, 2,5-dimethyl-2,5-di(tert-butyl peroxy)hexyne-3, 1,3-bis(tert-butyl peroxyisopropyl)benzene, 1,1-bis(tert-butyl peroxy)-3,3,5-trimethylcyclohexane, n-butyl-4,4-bis(tert-butyl peroxy)valerate, benzoyl peroxide, p-chlorobenzoyl peroxide, 2,4-dichlorobenzoyl peroxide, tert-butyl peroxybenzoate, tert-butyl peroxyisopropyl carbonate, diacetyl peroxide, lauroyl peroxide, tert-butylcumyl peroxide and the like. Among them, dicumyl peroxide, 2,5-dimethyl-2,5-di-(tert-butyl peroxy)hexane, or 2,5-dimethyl-2,5-di-(tert-butyl peroxy)hexyne-3 is preferable, from the standpoint of odor, coloration, and scorch stability.

The decomposition temperature of the organic peroxide is preferably 80 to 195° C., and more preferably 125 to 180° C.

For the present invention, the decomposition temperature of the organic peroxide means the temperature, at which, when an organic peroxide having a single composition is heated, the organic peroxide itself causes a decomposition reaction and decomposes into two or more kinds of compounds at a certain temperature or temperature range. In specific, the decomposition temperature is a temperature at which heat absorption or heat generation starts, when the organic peroxide is heated from a room temperature in a heating rate of 5° C./min under a nitrogen gas atmosphere, by a thermal analysis such as a DSC method.

<Inorganic Filler>

In the present invention, the inorganic filler can be used without particular limitation, as long as the inorganic filler has, on a surface thereof, a site with which the inorganic filler can be chemically bonded to a reaction site, such as a silanol group or the like, of the silane coupling agent, by hydrogen bonding, covalent bonding or the like, or intermolecular bonding. For the inorganic filler, examples of the site that can be chemically bonded with the reaction site of the silane coupling agent may include an OH group (OH group of hydroxy group, of water molecule in hydrous substance or crystallized water, or of carboxyl group), amino group, a SH group, and the like.

As such an inorganic filler, though not limited to these, use can be made of metal hydrate, such as a compound having a hydroxy group or crystallized water, for example, aluminum hydroxide, magnesium hydroxide, calcium carbonate, magnesium carbonate, calcium silicate, magnesium silicate, calcium oxide, magnesium oxide, aluminum oxide, aluminum nitride, aluminum borate whisker, hydrated aluminum silicate, hydrated magnesium silicate, basic magnesium carbonate, hydrotalcite, and talc. Further, use can be made of boron nitride, silica (crystalline silica, amorphous silica, and the like), carbon, clay, zinc oxide, tin oxide, titanium oxide, molybdenum oxide, antimony trioxide, a silicone compound, quartz, zinc borate, white carbon, zinc borate, zinc hydroxystannate, or zinc stannate.

As the inorganic filler, a surface-treated inorganic filler, surface-treated with a silane coupling agent or the like can be used. Specific examples of silane-coupling-agent-surface-treated inorganic filler include KISUMA 5L and KISUMA 5P (both trade names, magnesium hydroxide, manufactured by Kyowa Chemical Industry Co., Ltd.) or the like. The amount of surface treatment of the inorganic filler with a silane coupling agent is not particularly limited, but is 3 mass % or less, for example.

Among these inorganic fillers, silica, aluminum hydroxide, magnesium hydroxide, calcium carbonate or antimony trioxide, or any combination of these is preferable.

The inorganic filler may be used singly alone, or in combination of two or more kinds thereof.

When the inorganic fillers is in a powder form, the inorganic filler has an average particle diameter of preferably 0.2 to 10 μm, more preferably 0.3 to 8 μm, further preferably 0.4 to 5 μm, and particularly preferably 0.4 to 3 μm. If the average particle diameter is within the above-described range, a silane coupling agent holding effect is high, to provide the product having excellent heat resistance. In addition, the inorganic filler is hard to cause secondary aggregation during mixing with the silane coupling agent, to provide the product having excellent outer appearance. The average particle diameter is obtained by dispersing the inorganic filler in alcohol or water, and then measuring using an optical particle diameter measuring device such as a laser diffraction/scattering particle diameter distribution measuring device.

<Silane Coupling Agent>

The silane coupling agent to be used in the present invention may be an agent at least having a grafting reaction site (a group or an atom) having a capability of being graft reacted onto the halogen-containing resin in the presence of a radical generated by decomposition of the organic peroxide, and a reaction site (including a moiety formed by hydrolysis: for example, a silyl ester group or the like) having both a capability of being silanol condensed, and a capability of reacting with the site having a capability of being chemically bonded in the inorganic filler. Specific examples of such a silane coupling agent include a silane coupling agent that has been used so far in the silane crosslinking method.

As such a silane coupling agent, for example, a compound represented by the following Formula (1) can be used.

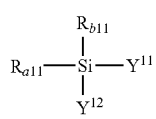

Formula (1)

In formula (1), $R_{a11}$ represents a group having an ethylenically unsaturated group, $R_{b11}$ represents an aliphatic hydrocarbon group, a hydrogen atom, or $Y^{13}$. $Y^{11}$, $Y^{12}$, and $Y^{13}$ each represent a hydrolyzable organic group. $Y^{11}$, $Y^{12}$, and $Y^{13}$ may be the same or different from each other.

$R_{a11}$ is a grafting reaction site, and is preferably a group containing an ethylenically unsaturated group. Specific examples of the group containing the ethylenically unsaturated group include a vinyl group, a (meth)acryloyloxyalkylene group and a p-styryl group. Among them, a vinyl group is preferable.

$R_{b11}$ represents an aliphatic hydrocarbon group, a hydrogen atom, or $Y^{13}$ to be described below, and example of the aliphatic hydrocarbon group may include a monovalent aliphatic hydrocarbon group having 1 to 8 carbon atoms other than an aliphatic unsaturated hydrocarbon group. $R_{b11}$ preferably represents $Y^{13}$ to be described below.

$Y^{11}$, $Y^{12}$ and $Y^{13}$ each independently represent a reaction site capable of silanol condensation (a hydrolyzable organic group). Examples thereof may include an alkoxy group having 1 to 6 carbon atoms, an aryloxy group having 6 to 10 carbon atoms, and an acyloxy group having 1 to 4 carbon atoms, and an alkoxy group is preferable. Specific examples of the hydrolyzable organic group may include methoxy, ethoxy, butoxy, and acyloxy. Among them, from the standpoint of the reactivity of the silane coupling agent, methoxy or ethoxy is preferable.

As the silane coupling agent, a silane coupling agent that has high hydrolysis rate is preferable, a silane coupling agent in which $R_{b11}$ is $Y^{13}$ and also $Y^{11}$, $Y^{12}$, and $Y^{13}$ and $Y^{13}$ are the same each other, or a silane coupling agent in which at least one of $Y^{11}$, $Y^{12}$, and $Y^{13}$ is a methoxy group, is more preferable.

Specific examples of the silane coupling agent include vinylsilanes such as vinyltrimethoxysilane, vinyltriethoxysilane, vinyltributoxysilane, vinyldimethoxyethoxysilane, vinyldimethoxybutoxysilane, vinyldiethoxybutoxysilane, allyltrimethoxysilane, allyltriethoxysilane, and vinyltriacetoxysilane, and (meth)acryloxysilanes such as methacryloxypropyltrimethoxysilane, methacryloxypropyltriethoxysilane, and methacryloxypropylmethyldimethoxysilane.

Among the silane coupling agents, the silane coupling agent having a vinyl group and an alkoxy group at an end is more preferable, and vinyltrimethoxysilane or vinyltriethoxysilane is particularly preferable.

The silane coupling agent may be used singly, or in combination of two or more kinds thereof. Further, the silane coupling agent may be used as it is, or may be diluted with a solvent and used.

<Silanol Condensation Catalyst>

The silanol condensation catalyst has an action of binding the silane coupling agents which have been grafted onto the halogen-containing resin to each other, by a condensation reaction, in the presence of water. Based on the action of the silanol condensation catalyst, the halogen-containing resin are crosslinked between themselves through silane coupling agent. As a result, the heat-resistant crosslinked resin formed body having excellent heat resistance can be obtained.

Examples of the silanol condensation catalyst to be used in the present invention include an organic tin compound, a metal soap, a platinum compound, and the like. Usual examples of the silanol condensation catalyst may include dibutyltin dilaurate, dioctyltin dilaurate, dibutyltin dioctylate, dibutyltin diacetate, zinc stearate, lead stearate, barium stearate, calcium stearate, sodium stearate, lead naphthenate, lead sulfate, zinc sulfate, an organic platinum compound, and the like. Among these, organic tin compounds such as dibutyltin dilaurate, dioctyltin dilaurate, dibutyltin dioctylate, and dibutyltin diacetate are particularly preferable.

<Carrier Resin>

A silanol condensation catalyst is used, if desired, in a form mixed with a resin. Such a resin (also referred to as a carrier resin) is not particularly limited, and each resin component or rubber component described in the halogen-containing resin can be used. The carrier resin preferably contains one kind or two or more kinds of resin components used in the silane master batch, in considering compatibility with the silane master batch.

<Additive>

To the heat-resistant crosslinked resin formed body and the like, various additives which are usually used for electric wires, electric cables, electric cords, sheets, foams, tubes, and pipes, may be properly used in the range that does not adversely affect the effects exhibited by the present invention. Examples of these additives include a crosslinking assistant, an antioxidant, a lubricant, a metal inactivator, a filling agent (including a flame retardant and a flame retardant aid), and the like.

The crosslinking assistant refers to one that forms a partial crosslinking structure with the halogen-containing resin component, in the presence of the organic peroxide. Examples thereof may include polyfunctional compounds, for example, a (meth)acrylate compound such as polypropyleneglycol diacrylate and trimethylolpropane triacrylate, an allyl compound such as triallyl cyanurate; a maleimide compound, or a divinyl compound.

The antioxidant is not particularly limited, but, for example, an amine-based antioxidant, a phenol-based antioxidant, sulfur-based antioxidant, and the like can be used. Examples of the amine-based antioxidant include 4,4'-dioctyl-diphenylamine, N,N'-diphenyl-p-phenylenediamine, 2,2,4-trimethyl-1,2-dihydroquinoline polymer; and the like. Examples of the phenol-based antioxidant include pentaerythritol-tetrakis(3-(3,5-di-tert-butyl-4-hydroxyphenyl) propionate), octadecyl-3-(3,5-di-tert-butyl-4-hydroxyphenyl)propionate, 1,3,5-trimethyl-2,4,6-tris(3,5-di-tert-butyl- 4-hydroxybenzyl)benzene; and the like. Examples of the sulfur-based antioxidant include bis(2-methyl-4-(3-n-alkyl-thiopropionyloxy)-5-tert-butylphenyl)sulfide, 2-mercapto-benzimidazole and zinc salts thereof, and pentaerythritol-tetrakis(3-lauryl-thiopropionate). The antioxidant is preferably included in a content of 0.1 to 15.0 parts by mass, and more preferably included in a content of 0.1 to 10 parts by mass, with respect to 100 parts by mass of the halogen-containing resin.

Examples of the metal inactivator may include N,N'-bis(3-(3,5-di-tert-butyl-4-hydroxyphenyl)propionyl)hydrazine, 3-(N-salicyloyl)amino-1,2,4-triazole, and 2,2'-oxamidebis(ethyl-3-(3,5-di-tert-butyl-4-hydroxyphenyl)propionate).

Specific examples of the flame retardant (flame retardant aid) or the filler include carbon, clay, zinc oxide, tin oxide, titanium oxide, magnesium oxide, molybdenum oxide, antimony trioxide, a silicone compound, quartz, talc, calcium carbonate, magnesium carbonate, zinc borate and white carbon. These filling agents may be used as the filler, in mixing the silane coupling agent, or may be added to the carrier resin.

Examples of the lubricant may include hydrocarbon-based, siloxane-based, fatty-acid-based, fatty-acid-amide-based, ester-based, alcohol-based, or metal-soap-based lubricants. These lubricants should be added to the carrier resin.

Next, the production method of the present invention is specifically described.

In the method for producing the heat-resistant crosslinked resin formed body of the present invention, the following step (a) to step (c) are performed.

In addition, the silane master batch of the present invention is produced through the following step (a), and the master batch mixture of the present invention is produced through the following step (a) and step (b).

Step (a): a step of melt-kneading 0.003 to 0.3 part by mass of an organic peroxide, 0.5 to 400 parts by mass of an inorganic filler, and more than 2 parts by mass and 15.0 parts by mass or less of a silane coupling agent, with respect to 100 parts by mass of a resin containing a halogen-containing resin, at a temperature equal to or higher than a decomposition temperature of the organic peroxide, to prepare a silane master batch;

Step (b): a step of mixing the silane master batch obtained in the step (a) with a silanol condensation catalyst, and then forming the resultant mixture; and Step (c): a step of bringing the formed body obtained in the step (b) into contact with moisture, to cause crosslinking.

Here, a term "mixing" means obtaining of a uniform mixture.

In the step (a), a blending amount of the organic peroxide is 0.003 to 0.3 part by mass, and preferably 0.005 to 0.1 part by mass, with respect to 100 parts by mass of the resin. If the blending amount of the organic peroxide is less than 0.003 part by mass, the grafting reaction does not progress, and unreacted silane coupling agents cause condensation with each other or unreacted silane coupling agent is volatilized, and sufficient heat resistance is unable to be obtained in several cases. On the other hand, if the blending amount thereof is over 0.3 part by mass, most of the resin components are directly crosslinked by a side reaction, to form aggregated substances, to cause poor outer appearance in several cases. In addition, the silane master batch or the like that is excellent in extrudability is unable to be obtained in several cases. That is, the grafting reaction can be performed in a suitable range by adjusting the blending amount of the organic peroxide within this range. Thus, the silane master batch or the like that is excellent in extrudability without generating a gel-like aggregated substance (aggregate) can be obtained.

The blending amount of the inorganic filler is 0.5 to 400 parts by mass, and preferably 30 to 280 parts by mass, with respect to 100 parts by mass of the resin. If the blending amount of the inorganic filler is less than 0.5 part by mass, the grafting reaction of the silane coupling agent becomes nonuniform, and the heat-resistant crosslinked resin formed body is unable to be provided with excellent heat resistance in several cases. In addition, the grafting reaction of the silane coupling agent becomes nonuniform, and the outer appearance of the heat-resistant crosslinked resin formed body is deteriorated in several cases. On the other hand, if the blending amount is over 400 parts by mass, a load during forming or kneading is significantly increased, and secondary forming becomes difficult in several cases. In addition, the heat resistance or the outer appearance is deteriorated in several cases.

The blending amount of the silane coupling agent is more than 2.0 parts by mass and 15.0 parts by mass or less, with respect to 100 parts by mass of the resin. If the blending amount of the silane coupling agent is 2.0 parts by mass or less, the crosslinking reaction does not progress sufficiently, and the excellent heat resistance is not exhibited in several cases. In addition, in forming together with the silanol condensation catalyst, poor outer appearance or the aggregated substance is generated, and when an extruder is stopped, a large number of aggregated substances are generated, in several cases. On the other hand, if the blending amount is over 15.0 parts by mass, the silane coupling agent is unable to be farther adsorbed on the inorganic filler surfaces, and the silane coupling agent is volatilized during kneading, and such a case is not economical. In addition, the silane coupling agent that is not adsorbed causes condensation, and a crosslinked gel or aggregated substance or a burn is generated in the formed body, and the outer appearance is liable to be deteriorated.

From the above-described viewpoints, the blending amount of the silane coupling agent is preferably 3 to 12.0 parts by mass, and more preferably 4 to 12.0 parts by mass, with respect to 100 parts by mass of the resin.

The blending amount of the silanol condensation catalyst is not particularly limited, and is preferably 0.0001 to 0.5 part by mass, and more preferably 0.001 to 0.2 part by mass, with respect to 100 parts by mass of the resin. If the blending amount of the silanol condensation catalyst is within the above-mentioned range, the crosslinking reaction by the condensation reaction of the silane coupling agent easily progresses substantially uniformly, and the heat resistance, the outer appearance and physical properties of the heat-resistant crosslinked resin formed body are excellent, and productivity thereof is also improved. That is, if the blending amount of the silanol condensation catalyst is excessively small, the crosslinking by the condensation reaction of the silane coupling agent becomes hard to progress, and the heat resistance of the heat-resistant crosslinked resin formed body is hard to be improved and the productivity is reduced, or the crosslinking becomes nonuniform, in several cases. On the other hand, if the blending amount is excessively large, the silanol condensation reaction progresses significantly rapidly, and partial gelation is caused, and the outer appearance is deteriorated in several cases. In addition, the physical properties of the heat-resistant crosslinked resin formed body (resin) are reduced in several cases.

In the present invention, an expression "melt-mixing the resin, the organic peroxide, the inorganic filler and the silane coupling agent" does not specify the mixing order in melt-mixing, and means that such materials may be mixed in any order. The mixing order in the step (a) is not particularly limited. In the present invention, the inorganic filler is preferably mixed with the silane coupling agent and used. That is, in the present invention, each component described above is preferably (melt-)mixed through the following steps (a-1) and (a-2).

Step (a-1): a step of mixing at least the inorganic filler and the silane coupling agent, to prepare a mixture.

Step (a-2): a step of melt-mixing the mixture obtained in the step (a-1) with all or part of the resin, in the presence of the organic peroxide, at a temperature equal to or higher than a decomposition temperature of the organic peroxide.

In the above-described step (a-2), the present invention includes "an aspect in which a total amount (100 parts by mass) of the resin is blended" and "an aspect in which part of the resin is blended". When part of the resin is blended in the step (a-2), a remainder of the resin is preferably blended in the step (b).

In the present invention, a term "part of the resin" means a resin used in the step (a-2) among the resins, and means part of the resin itself (having the same composition with the resin), part of a resin component constituting the resin, and a resin component constituting the resin (for example, a total amount of a specific resin component among a plurality of resin components).

In addition, a term "a remainder of the resin" means a remaining resin except the part used in the step (a-2) in the resin, and specifically, means a remainder of the resin itself, a remainder of the resin component constituting the resin, and a remaining resin component constituting the resin.

When part of the resin is blended in the step (a-2), 100 parts by mass in the blending amount of the resin in the step (a) and the step (b) are a total amount of the halogen-containing resin to be mixed in the step (a-2) and the step (b).

Here, when the remainder of the resin is blended in the step (b), the resin is blended preferably in an amount of 80 to 99% by mass, and more preferably in an amount of 85 to 95% by mass in the step (a-2), and is blended preferably in an amount of 1 to 20% by mass, and more preferably in an amount of 5 to 15% by mass in the step (b).

In the present invention, as described above, the silane coupling agent is preferably pre-mixed or the like with the inorganic filler (step (a-1)).

The method of mixing the inorganic filler and the silane coupling agent is not particularly limited, and mixing methods such as wet treatment and dry treatment can be mentioned. Specific examples thereof include wet treatment in which a silane coupling agent is added in a solvent such as alcohol and water in a state in which an inorganic filler is dispersed, dry treatment in which the silane coupling agent is added and mixed, under heating or non-heating, to an untreated inorganic filler or to an inorganic filler preliminary subjected to surface treatment with stearic acid, oleic acid, phosphate or partially with the silane coupling agent, and both of these treatments. In the present invention, a dry treatment is preferable in which the silane coupling agent is added to the inorganic filler, preferably a dried inorganic filler, and mixed under heating or non-heating.

The pre-mixed silane coupling agent exists in such a manner of surrounding the surface of the inorganic filler, and a part or a whole thereof is adsorbed or bonded on the inorganic filler. In this manner, it becomes possible to suppress the volatilization of the silane coupling agent in the subsequent melt-mixing. Further, it is also possible to prevent the condensation among the silane coupling agents that are not adsorbed or bonded on the inorganic fillers, which makes melt-blending difficult. Furthermore, a desired shape can be obtained upon extrusion forming.

Specific examples of such a mixing method include a method in which an inorganic filler and a silane coupling agent are preferably mixed (dispersed) according to a dry method or a wet method at a temperature lower than a decomposition temperature of the organic peroxide, preferably at room temperature (25° C.), for about several minutes to several hours, and then this mixture and the resin are melt-mixed in the presence of the organic peroxide. This mixing is preferably performed by a mixer type kneading machine such as a Banbury mixer and a kneader. In this manner, an excessive crosslinking reaction between the resin components can be prevented, to provide the product having excellent outer appearance.

In this mixing method, the resin may exist as long as the above-described temperature lower than the decomposition temperature is kept. In this case, it is preferable to mix metal oxide and the silane coupling agent together with the resin at the above-described temperature (step (a-1)), and then melt-mix the resultant material.

A method of mixing the organic peroxide is not particularly limited, and the organic peroxide only needs to exist in melt-mixing the above-described mixture and the resin. The organic peroxide may be mixed, for example, simultaneously with the inorganic filler and the like, or may be mixed in any of stages of mixing the inorganic filer and the silane coupling agent, or may be mixed with a mixture of the inorganic filler and the silane coupling agent. For example, the organic peroxide may be mixed with the inorganic filler after the organic peroxide is mixed with the silane coupling agent, or may be mixed with the inorganic filler separately from the silane coupling agent. Only the silane coupling agent may be mixed with the inorganic filler, and then the organic peroxide may be mixed, depending on production conditions.

In addition, the organic peroxide may be a material mixed with any other component or a single body.

In the method of mixing the inorganic filler and the silane coupling agent, bonding force between the silane coupling agent and the inorganic filler is strong in wet mixing, and therefore volatilization of the silane coupling agent can be effectively suppressed, but the silanol condensation reaction becomes hard to progress in several cases. On the other hand, the silane coupling agent is easily volatilized in dry mixing, but the bonding force between the inorganic filler and the silane coupling agent is comparatively weak, and therefore the silanol condensation reaction becomes easy to progress efficiently.

In the production method of the present invention, the obtained mixture, all or part of the resin, and the remaining component(s) that is not mixed in the step (a-1) are subsequently melt-kneaded in the presence of the organic peroxide while the mixture is heated to the temperature equal to or higher than the decomposition temperature of the organic peroxide (step (a-2)).

In the step (a-2), the temperature at which the above-described component are melt-mixed (also referred to as melt-kneaded or kneaded) is equal to or higher than the decomposition temperature of the organic peroxide, preferably a temperature of the decomposition temperature of the organic peroxide plus (25 to 110)° C. This decomposition temperature is preferably set after the resin components are melted. If the above-described mixing temperature is applied, the above-described components are melted, and the organic peroxide is decomposed and acts thereon, and a required silane grafting reaction sufficiently progresses in the step (a-2). Other conditions, for example, a mixing time can be appropriately set.

A mixing method is not particularly limited, as long as the mixing method is a method ordinarily applied for rubber, plastic or the like. A mixing device may be appropriately selected depending on, for example, the mixing amount of the inorganic filler. As a kneading device, a single-screw extruder, a twin-screw extruder, a roll, a Banbury mixer, or various kneaders may be used. From the standpoint of the dispersibility of the resin components and the stability of the crosslinking reaction, an enclosed mixer such as Banbury mixer or various kneaders is preferable.

In addition, when the inorganic filler is blended exceeding 100 parts by mass with respect to 100 parts by mass of the resin, the kneading is preferably performed with an enclosed mixer such as a continuous kneader, a pressured kneader, or a Banbury mixer.

The method of mixing the resin containing the halogen-containing resin is not particularly limited. For example, a resin preliminarily mixed and prepared may be used, or each component, for example, each of the resin component such as the halogen-containing resin, the oil component and the plasticizer may be separately mixed.

In the present invention, when each component described above is melt-mixed at one time, melt-mixing conditions are not particularly limited, and the conditions in the step (a-2) can be adopted.

In this case, part or all of the silane coupling agent is adsorbed or bonded to the inorganic filler during melt-mixing.

In the step (a), especially in the step (a-2), the above-mentioned each component is preferably kneaded without substantially mixing the silanol condensation catalyst. Thus, condensation reaction of the silane coupling agents can be suppressed, melt-mixing is easily conducted, and a desired shape can be obtained at the time of extrusion forming. Here, the term "without substantially mixing" does not meant to exclude the situation wherein the silanol condensation catalyst unavoidably exists, and means that the silanol condensation catalyst may exist at a degree at which the above-mentioned problem due to silanol condensation of the silane coupling agent is not caused. For example, in the step (a-2), the silanol condensation catalyst may exist when the content is 0.01 part by mass or less, with respect to 100 parts by mass of the resin.

In the step (a), the blending amount of any other resin that can be used in addition to the above-described component or the above-described additive is appropriately set within the range in which the object of the present invention is not adversely affected.

In the step (a), the above-described additive, particularly, the antioxidant or the metal inactivator may be mixed in any step or to any component, but may be mixed in the carrier resin in view of not inhibiting the grafting reaction of the silane coupling agent mixed in the inorganic filler to the resin.

In the step (a), particularly in the step (a-2), it is preferable that the crosslinking assistant is not substantially mixed. If the crosslinking assistant is not substantially mixed, the crosslinking reaction between the resin components is hard to occur by the organic peroxide during melt-mixing, and the product having excellent outer appearance can be obtained. In addition, the grafting reaction of the silane coupling agent to the resin is hard to occur, and the product having excellent heat resistance can be obtained. Here, an expression "not substantially mixed" means that the crosslinking assistant may exist at a degree at which the above-described problem is not caused, and does not exclude the crosslinking assistance existing inevitably.

Thus, the silane master batch (also referred to as a silane MB) for use in producing the master batch mixture is prepared by performing the step (a). This silane MB contains a silane crosslinkable resin in which the silane coupling agent is grafted to the resin at a degree at which the resin can be formed in the step (b) described later.

In the production method of the present invention, the step (b) in which the silane MB obtained in the step (a) is mixed with the silanol condensation catalyst, and then the resultant mixture is formed, is subsequently performed.

In the step (b), when part of the resin is melt-mixed in the above-described step (a-2), the remainder of the resin and the silanol condensation catalyst are melt-mixed, to prepare a catalyst master batch (also referred to as a catalyst MB), and this catalyst MB is used. In addition, any other resin can be used in addition to the remainder of the resin.

A mixing ratio of the above described remainder of the resin as the carrier resin to the silanol condensation reaction catalyst is not particularly limited, but is preferably set so as to satisfy the above-described content in the step (a).

The mixing only needs to be performed by a method having a capability of uniformly performing mixing, and specific examples thereof include mixing (melt-mixing) performed under melting of the resin. The melt-mixing can be performed in a manner similar to the melt-mixing in the above-described step (a-2). For example, the mixing temperature is preferably from 80 to 250° C., and more preferably from 100 to 240° C. Other conditions such as a mixing time can be appropriately set.

The catalyst MB to be thus prepared is a mixture of the silanol condensation catalyst and the carrier resin, and the filler to be added if desired.

On the other hand, when all of the resin is melt-mixed in the step (a-2), the silanol condensation catalyst itself, or a mixture of any other resin and the silanol condensation catalyst is used. A method of mixing any other resin and the silanol condensation catalyst is similar to the method for the above-described catalyst MB.

A blending amount of any other resin is preferably 1 to 60 parts by mass, more preferably 2 to 50 parts by mass, and further preferably 2 to 40 parts by mass, with respect to 100 parts by mass of the resin, in view of capability of promoting the grafting reaction in the step (a-2), and also difficulty in generating the aggregated substance during forming.

In the production method of the present invention, the silane MB and the silanol condensation catalyst (the silanol condensation catalyst itself, the catalyst MB prepared or the mixture of the silanol condensation catalyst and any other resin) are mixed.

As the mixing method, any mixing method may be employed as long as the uniform mixture can be obtained as mentioned above. For example, the mixing is basically similar to the melt-mixing in the step (a-2). There are resin components whose melting points cannot be measured by DSC or the like, elastomers for example, but kneading is performed at a temperature at which at least the resin melts. The melting temperature is appropriately selected according to the melting temperature of the resin or the carrier resin, and it is preferably from 80 to 250° C., and more preferably from 100 to 240° C. Other conditions, for example, a mixing (kneading) time can be appropriately set.

In the step (b), in order to avoid the silanol condensation reaction, it is preferable that the silane MB and the silanol condensation catalyst are not kept in a high temperature state for a long period of time in the state of being mixed.

In the step (b), the silane MB and the silanol condensation catalyst only need to be mixed, and the silane MB and the catalyst MB are preferably melt-mixed.

In the present invention, the silane MB and the silanol condensation catalyst can be dry-blended before both are melt-mixed. A method and conditions of dry blending are not particularly limited, and specific examples thereof include dry mixing and conditions in the step (a-1). The master batch mixture containing the silane MB and the silanol condensation catalyst is obtained by this dry blending.

In the step (b), the inorganic filler may be used. In this case, a blending amount of the inorganic filler is not particularly limited, and is preferably 350 parts by mass or less, with respect to 100 parts by mass of the carrier resin. The reason is that, if the blending amount of the inorganic filler is excessively large, the silanol condensation catalyst is hard to disperse, and the crosslinking becomes hard to progress. On the other hand, if the blending amount of the inorganic filler is excessively small, a crosslinking degree of the formed body is reduced and sufficient heat resistance is not obtained in several cases.

In the present invention, the mixing in the step (a) and step (b) can be simultaneously or continuously performed.

In the step (b), the mixture thus obtained is formed (shaped).

This forming step only needs to be capable of forming the mixture, and a forming method and forming conditions are appropriately selected according to a form of the heat-resistant product of the present invention. Specific examples of the forming method include extrusion forming using an extruder, extrusion forming using an injection forming machine, and forming using any other forming machine. The extrusion forming is preferable when the heat-resistant product of the present invention is the electric wire or the optical fiber cable.

In the step (b), the forming step can be performed simultaneously with the above-described mixing step or both steps can be continuously performed. That is, specific examples of one embodiment of the melt-mixing in the mixing step include an aspect of melt-mixing a forming raw material, in the melt-forming, for example, in the extrusion forming, or immediately before the extrusion forming. For example, pellets may be blended with each other at ordinary temperature or a high temperature, such as dry blend, and then placed (melt-mixed) in a forming machine, or the pellets may be blended, and then melt-mixed, re-pelletized, and then placed in a forming machine. More specifically, a series of steps can be employed in which a mixture of the silane MB and the silanol condensation catalyst (forming-raw materials) is melt-kneaded in a coating device, and subsequently, extruded and coated on a periphery of a conductor or the like, and formed into a desired shape.

Thus, the formed body of the heat-resistant crosslinkable resin composition is obtained, in which the silane master batch and the silanol condensation catalyst are dry-blended, to prepare the master batch mixture, and the master batch mixture is introduced into the forming machine and formed.

Here, a melt mixture of the master batch mixture contains the silane crosslinkable resin with different crosslinking methods. In this silane crosslinkable resin, the reaction site of the silane coupling agent may be bonded or adsorbed to the inorganic filler, but is not subjected to silanol condensation as described later. Accordingly, the silane crosslinkable resin contains at least a crosslinkable resin in which the silane coupling agent bonded or adsorbed to the inorganic filler is grafted to the resin (halogen-containing resin), and a crosslinkable resin in which the silane coupling agent not bonded or adsorbed to the inorganic filler is grafted to the resin. In addition, the silane crosslinkable resin may have the silane coupling agent to which the inorganic filler is bonded or adsorbed, and the silane coupling agent to which the inorganic filler is not bonded or adsorbed. Further, the silane crosslinkable resin may contain the resin component unreacted with the silane coupling agent.

As described above, the silane crosslinkable resin is an uncrosslinked body in which the silane coupling agent is not subjected to silanol condensation. Practically, if the melt-mixing is performed in the step (b), crosslinking of part (partial crosslinking) is inevitable, but at least formability during forming is to be kept on the heat-resistant crosslinkable resin composition to be obtained.

In the formed body to be obtained through the step (b), partial crosslinking is inevitable in a manner similar to the above-described mixture, but the formed body is in a partially crosslinked state of keeping formability at which the composition can be formed in the step (b). Accordingly, this heat-resistant crosslinked resin formed body of the present invention is obtained as a formed body crosslinked or finally crosslinked, by performing the step (c).

In the method for producing the heat-resistant crosslinked resin formed body of the present invention, the step (c) of bringing the formed body obtained in the step (b) into contact with water is performed. Thus, the reaction site of the silane coupling agent is hydrolyzed into silanol, and hydroxyl groups of the silanol are subjected to condensation by the silanol condensation catalyst existing in the formed body, and the crosslinking reaction occurs. Thus, the heat-resistant crosslinked resin formed body in which the silane coupling agent is subjected to silanol condensation and crosslinked can be obtained.

The treatment itself in this step (c) can be carried out according to an ordinary method. The condensation reaction between the silane coupling agents progresses just in storage at ordinary temperature. Accordingly, in the step (c), it is unnecessary to positively bring the formed body into contact with water. In order to accelerate this crosslinking reaction, the formed body can also be contacted positively with moisture. For example, the method of positively contacting the formed body with water can be employed, such as immersion into warm water, placement in a wet heat bath, and exposure to high temperature water vapor. In addition, pressure may be applied in order to penetrate moisture thereinto on the above occasion.

Thus, the method for producing the heat-resistant crosslinked resin formed body of the present invention is performed, and the heat-resistant crosslinked resin formed body is produced. This heat-resistant crosslinked resin formed body contains a crosslinked resin in which the (silane crosslinkable) resins are subjected to condensation through silanol bonding (siloxane bonding). As one form of this silane crosslinked resin formed body, the formed body contains the silane crosslinked resin and the inorganic filler. Here, the inorganic filler may be bonded to the silane coupling agent of the silane crosslinked resin. Accordingly, the present invention includes an aspect in which the resin containing the halogen-containing resin is crosslinked with the inorganic filler through the silanol bonding. Specifically, the silane crosslinked resin contains at least the crosslinked resin in which a plurality of crosslinked resins are bonded or adsorbed to the inorganic filler by the silane coupling agent and are bonded (crosslinked) through the inorganic filler and the silane coupling agent, and the crosslinked resin in which the reaction sites of the silane coupling agent grafted to the above-described crosslinkable resin are hydrolyzed and cause the silanol condensation reaction with each other, thereby being crosslinked through the silane coupling agent. In addition, in the silane crosslinked resin, bonding (crosslinking) through the inorganic filler and the silane coupling agent and crosslinking through the silane coupling agent may be mixed. Further, the silane crosslinked resin may contain the resin component unreacted with the silane coupling agent and/or the uncrosslinked silane crosslinkable resin.

The production method of the present invention can be described as follows.

The method for producing the heat-resistant crosslinked resin formed body, having the following step (A), step (B) and step (C), in which the step (A) has the following step (A1) to step (A4).

Step (A): a step of mixing 0.003 to 0.3 part by mass of an organic peroxide, 0.5 to 400 parts by mass of an inorganic filler, and more than 2 parts by mass and 15.0 parts by mass or less of a silane coupling agent, with respect to 100 parts by mass of a resin containing a halogen-containing resin, and a silanol condensation catalyst, to obtain a mixture;

Step (B): a step of forming the mixture obtained in the step (A), to obtain a formed body; and Step (C): a step of bringing the formed body obtained in the step (B) into contact with water, to obtain a heat-resistant crosslinked resin formed body;

Step (A1): a step of mixing at least the inorganic filler and the silane coupling agent;

Step (A2): a step of melt-mixing the mixture obtained in the step (A1) and all or part of the resin, in the presence of the organic peroxide, at a temperature equal to or higher than a decomposition temperature of the organic peroxide;

Step (A3): a step of mixing the silanol condensation catalyst with, as a carrier resin, a resin different from the resin containing the halogen-containing resin or a remainder of the resin containing the halogen-containing resin; and Step (A4): a step of mixing the melt mixture obtained in the step (A2) with the mixture obtained in the step (A3).

In the above-described method, the step (A) corresponds to the above-described step (a) and a step to the mixing in the step (b), the step (B) corresponds to the forming step in the above-described step (b), and the step (C) corresponds to the above-described step (c). In addition, the step (A1), the step (A2), the step (A3) and step (A4) correspond to the above-described step (a-1), step (a-2), and the step to the mixing in the above-described step (b), respectively.

Details of a reaction mechanism in the production method of the present invention are unknown yet, but it is considered as described below.

In general, if the organic peroxide is added to the resin (halogen-containing resin or halogen-containing rubber), a radical is rapidly generated to facilitate occurrence of the crosslinking reaction between the resins or the decomposition reaction thereof. Thus, the aggregated substance is generated in the obtained heat-resistant crosslinked resin formed body and the physical properties thereof are reduced.

However, in the present invention, a large amount of the silane coupling agent is blended, and the silane coupling agent is further preliminarily bonded to the inorganic filler by the silanol bonding, the hydrogen bonding or the intermolecular bonding, in the step (a). In particular, in the preferred embodiment of the step (a), the treatment in which this bonding is formed, and the melt-mixing treatment are conducted, separately. Thus, it is considered that a chance of causing the grafting reaction between the grafting reaction site of the silane coupling agent and the halogen-containing resin is increased. It is considered that the boding reaction between this kept silane coupling agent and the radical generated in the resin becomes dominant over the crosslinking reaction between the resins or the decomposition reaction described above. Accordingly, it is considered that silane crosslinking can be formed, and furthermore deterioration or crosslinking of the halogen-containing resin is not caused during this reaction (step (a)), and therefore generation of the aggregated substance or reduction of the physical properties is hard to occur.

When these materials are kneaded (melt-mixed) in the step (a), the silane coupling agent bonded or adsorbed to the inorganic filler by weak bonding (interaction by the hydrogen bonding, interaction between ions, partial charges or dipoles, action by adsorption or the like) is detached from the inorganic filler, resulting in causing the grafting reaction with the resin. In the silane coupling agent thus graft-reacted, the reaction sites capable of silanol condensation are subjected to the condensation reaction (crosslinking reaction) to form the resin crosslinked through the silanol condensation. The heat resistance of the heat-resistant crosslinked resin formed body obtained through this crosslinking reaction is increased, and the heat-resistant crosslinked resin formed body which is not melted even at a high temperature can be obtained.

On the other hand, in the silane coupling agent bonded to the inorganic filler by strong bonding (chemical bonding with the hydroxyl group or the like on the surface of the inorganic filler, or the like), this condensation reaction by the silanol condensation catalyst in the presence of water is hard to occur, and bonding with the inorganic filler is kept. Therefore, bonding (crosslinking) of the resin with the inorganic filler through the silane coupling agent is formed. Thus, adhesion between the resin and the inorganic filler is consolidated, and the formed body that is excellent in mechanical strength and abrasion resistance and hard to be scratched is obtained. In particular, a plurality of silane coupling agents can be bonded to one inorganic filler particle surface, and high mechanical strength can be obtained.

It is estimated that the heat-resistant crosslinked resin formed body having high heat resistance can be obtained by forming these silane-grafted resins together with the silanol condensation catalyst, and then bringing the resultant material into contact with moisture.

In the present invention, the heat-resistant crosslinked resin formed body having high heat resistance can be obtained by mixing the organic peroxide in a ratio of 0.003 part by mass or more, preferably 0.005 part by mass or more, and 0.3 part by mass or less, and preferably 0.1 part by mass or less, and further mixing the silane coupling agent in a ratio of more than 2 parts by mass and 15 parts by mass or less, with respect to 100 parts by mass of the resin, in the presence of the inorganic filler.

The production method of the present invention is applicable to a production of a component part of or a member of a product (including a semi-finished product, a part and a member), such as a product requiring heat resistance, a product requiring strength, a product requiring flame retardancy, and a product using a rubber material. Accordingly, the heat-resistant product of the present invention is processed into such a product. At this time, the heat-resistant product may be a product containing the heat-resistant crosslinked resin formed body, or a product consisting of the heat-resistant crosslinked resin formed body.

Specific examples of such a heat-resistant product include an electric wire such as a heat-resistant flame-retardant insulated wire, a coating material for heat-resistant flame-retardant cable or optical fiber cable, a rubber substitute wire and cable material, other heat-resistant flame-retardant wire parts, a flame-retardant heat-resistant sheet, and a flame-retardant heat-resistant film. In addition, the specific examples further include a power supply plug, a connector, a sleeve, a box, a tape-base material, a tube, a sheet, a packing, a cushion material, a seismic isolating material, a wiring material used in internal and external wiring for electric and electronic instruments, and particularly an electric wire or an optical fiber cable.

Among the above described products, the production method of the present invention is particularly preferably applied to production of electric wire and optical fiber cable, and it can form a coating material (an insulator, a sheath) thereof.

When the heat-resistant product of the present invention is an extrusion formed article such as the electric wire or the optical fiber cable, the product can be produced, preferably, while forming materials are melt-kneaded in the extruder (extrusion coating device) to prepare the heat-resistant crosslinkable resin composition, by extruding this heat-resistant crosslinkable resin composition on an outer periphery of the conductor or the like, to coat the conductor or the like. Such a heat-resistant product can be formed by extruding and coating the heat-resistant crosslinkable resin composition, even if a large amount of inorganic fillers is added thereto, on a circumference of a conductor or a circumference of a conductor longitudinally lapped or twisted with tensile strength fibers, by using a general-purpose extrusion coating device, without using a special machine such as an electron beam crosslinking machine. For example, as the conductor, a single wire, a stranded wire or the like of annealed copper can be used. Moreover, as the conductor, in addition to a bare wire, a tin-plated conductor or a conductor having an enamel-coating insulation layer can be used. A thickness of the insulation layer (coating layer formed of the heat resistant crosslinked resin formed body of the present invention) formed around the conductor is not particularly limited, but is generally about 0.15 to 5 mm.

EXAMPLES

The present invention will be described in more detail based on examples given below, but the invention is not meant to be limited by these.

In Tables 1 and 2, the numerical values for the content of the respective Examples and Comparative Examples are in terms of part by mass, unless otherwise specified.

Examples and Comparative Examples were carried out by using the following components, and setting respective specifications to conditions shown in Tables 1 and 2, and the results of evaluation as mentioned later are collectively shown in Tables 1 and 2.

Details of each compound shown in Tables 1 and 2 are described below.

A chlorine content of chlorinated polyethylene and a fluorine content of fluorocarbon rubber are determined based on the above-described measuring methods.
<Resin>
(Halogen-Containing Resin)

"ELASLEN 401A" (trade name, manufactured by Showa Denko K.K., chlorinated polyethylene, chlorine content: 40% by mass)

"ELASLEN 402NA-X5" (trade name, manufactured by Showa Denko K.K., chlorinated polyethylene, chlorine content: 40% by mass)

"ELASLEN 351A" (trade name, manufactured by Showa Denko K.K., chlorinated polyethylene, chlorine content: 35% by mass)

"ELASLEN 353" (trade name, manufactured by Showa Denko K.K., chlorinated polyethylene, chlorine content: 35% by mass)

"ZEST 1000" (trade name, manufactured by Tokuyama Corporation, polyvinyl chloride (PVC), chlorine content: 57% by mass)

"SKYPRENE E-33" (trade name, manufactured by Tosoh Corporation, chloroprene rubber, chlorine content: 40% by mass)

"AFLAS 150P" (trade name, manufactured by Asahi Glass Co., Ltd., fluorocarbon rubber (tetrafluoroethylene-propylene copolymer), fluorine content:
57% by mass)
(Other Components)

"TRIMEX N-08" (trade name, manufactured by Kao Corporation, trimellitic acid-based plasticizer)

"ADK CIZER-0130P" (trade name, manufactured by ADEKA Corporation, epoxidized soybean oil)
<Inorganic Filler>

"DHT4A" (trade name, manufactured by Kyowa Chemical Industry Co., Ltd., hydrotalcite)

"KISUMA 5L" (trade name, manufactured by Kyowa Chemical Industry Co., Ltd., magnesium hydroxide pre-treated with a silane coupling agent)

"CRYSTALITE 5X" (trade name, manufactured by Tatsumori Ltd., crystalline silica)

"SOFTON 2200" (trade name, manufactured by BIHOKU FUNKA KOGYO CO., LTD., calcium carbonate)

"Aerosil 200" (trade name, manufactured by Japan Aerosil corporation, hydrophilic fumed silica, amorphous silica)
<Silane Coupling Agent>

"KBM-1003" (trade name, manufactured by Shin-Etsu Chemical Co., Ltd., vinyltrimethoxysilane)

"KBE-1003" (trade name, manufactured by Shin-Etsu Chemical Co., Ltd., vinyltriethoxysilane)
<Organic Peroxide>

"PERHEXA 25B" (trade name, manufactured by NOF CORPORATION, 2,5-dimethyl-2,5-di(tert-butylperoxy) hexane, decomposition temperature 149° C.)
<Silanol Condensation Catalyst>

"ADKSTAB OT-1" (trade name, manufactured by ADEKA CORPORATION, dioctyltin dilaurate)
<Antioxidizing Agent>

"IRGANOX 1010" (trade name, manufactured by BASF, pentaerythritol tetrakis [3-(3,5-di-tert-butyl-4-hydroxyphenyl)propionate])

Examples 1 to 12 and Comparative Examples 1 to 6

In Examples 1 to 12 and Comparative Examples 1 to 6, 10% by mass of the resin (chlorinated polyethylene) was used as a carrier resin of a catalyst MB.

First, an inorganic filler and a silane coupling agent, in mass ratios listed in Tables 1 and 2, were placed in a 10 L Henschel mixer manufactured by Toyo Seiki Seisaku-sho, Ltd. and the resultant mixture was mixed at room temperature (25° C.) for 1 hour to obtain a powder mixture. Next, the power mixture thus obtained, and each component listed in a halogen-containing resin column and the organic peroxide in Tables 1 and 2, in mass ratios listed in Tables 1 and 2, were placed in a 2 L Banbury mixer manufactured by Nippon Roll MFG. Co., Ltd., and the resultant mixture was kneaded at a temperature equal to or higher than a decomposition temperature of the organic peroxide, specifically, at 190° C., for 10 minutes, and then discharged at a material discharge temperature of 190° C., to obtain a silane MB. The silane MB obtained contains a silane crosslinkable resin in which the silane coupling agent is graft-reacted onto the resin.

Meanwhile, a carrier resin, a silanol condensation catalyst and an antioxidant were melt-mixed by a Banbury mixer at 180 to 190° C., in mass ratios listed in Tables 1 and 2, and the resultant mixture was discharged at material discharge temperature of 180 to 190° C., to obtain a catalyst MB. This catalyst MB is a mixture of the carrier resin and the silanol condensation catalyst.

Subsequently, the silane MB and the catalyst MB were placed in an enclosed ribbon blender, and the resultant mixture was dry-blended at room temperature (25° C.) for 5 minutes, to obtain a dry-blended product (master batch mixture). At this time, a mixing ratio of the silane MB to the catalyst MB is a mass ratio listed in Tables 1 and 2. Specifically, a proportion was adjusted, in each example, sot that the halogen-containing resin in the silane MB would be 90 parts by mass, and the carrier resin in the catalyst MB would be 10 parts by mass.

Subsequently, the obtained dry-blended product was introduced into an extruder equipped with a screw having a screw diameter of 30 mm with L/D=24 (ratio of screw effective length L to diameter D) (compression zone screw temperature: 170° C., head temperature: 200° C.). While the dry-blended product was melt-mixed in this extruder, the melted mixture was coated on an outside of a 1/0.8 TA conductor at a thickness of 1 mm, to obtain a coated conductor having an outer diameter of 2.8 mm. This coated conductor was left to stand for one week under an atmosphere of a temperature of 40° C. and a relative humidity of 95%.

Thus, an electric wire having a coating layer formed of the heat-resistant crosslinked resin formed body on an outer periphery of the above-described conductor was produced. The heat-resistant crosslinked resin formed body as the coating layer has the above-mentioned silane crosslinked resin.

In Comparative Example 1, a large number of aggregated substances were generated and extrusion forming was unable to be performed.

A heat-resistant crosslinkable resin composition was prepared by melt-mixing the above-described dry-blended product in the extruder before extrusion forming. This heat-resistant crosslinkable resin composition is a melt mixture of the silane MB and the catalyst MB, and contains the above-mentioned silane crosslinkable resin.

The following tests were conducted on each electric wire produced, and the results are shown in Tables 1 and 2.

<Heat Deformation Test>

A heat deformation test was conducted on each electric wire produced at a measuring temperature of 150° C. and a load of 5 N based on UL1581. In this test, with regard to heat deformation, a case where a deformation ratio was 50% or less was deemed as pass.

<Hot Set Test>

A hot set test was conducted by using a tubular piece prepared by extracting a conductor from each electric wire produced. In the hot set test, marker lines having a length of 50 mm were attached on the tubular piece, and then the tubular piece to which a weight of 117 g was attached was left to stand in a constant temperature chamber at a temperature of 170° C. for 15 minutes, and elongation was determined by measuring a length after being left to stand. In addition, a case where the elongation is 100% or less was deemed as pass in this test, and was expressed as "A". A case where the elongation was over 100% was expressed as "C".

<Extrusion Outer Appearance Test>

As an extrusion outer appearance test, outer appearance of a coated conductor was observed and evaluated in producing the coated conductor.

A product which was able to be formed into an electric wire form without the aggregated substance on the outer appearance of the coated conductor was expressed as "A", a product which was able to be formed into an electric wire form, although generation of the aggregated substance was able to be confirmed even at a degree of having no problem on the outer appearance, was expressed as "B", and a product which was unable to be formed into an electric wire form by significant generation of poor outer appearance was expressed as "C". The extrusion outer appearance test is a reference test, and "B" evaluation or better is deemed as a pass level in this test.

In the electric wire in Comparative Example 5, poor outer appearance caused by foaming was confirmed.

TABLE 1

| | | | | Example | | | | | | | | |
|---|---|---|---|---|---|---|---|---|---|---|---|---|
| | | | | 1 | 2 | 3 | 4 | 5 | 6 | 7 | 8 | 9 |
| Silane MB | Halogen-containing resin | Chlorinated polyethylene | ELASLEN 401A | | | | | | | | | 30 |
| | | Chlorinated polyethylene | ELASLEN 402NA-X5 | 90 | 90 | 90 | | | | | | 35 |
| | | Chlorinated polyethylene | ELASLEN 351A | | | | 85 | | | 60 | | |
| | | Chlorinated polyethylene | ELASLEN 353 | | | | | 90 | | | | |
| | | PVC | ZEST 1000 | | | | | | 90 | | | |
| | | Chloroprene rubber | SKYPRENE E-33 | | | | | | | 30 | | |
| | | Fluorocarbon rubber | AFLAS 150P | | | | | | | | 90 | |
| | | Trimellitic acid-based plasticizer | TRIMEX N-08 | | | | | | | | | 25 |
| | | Epoxidized soybean oil | ADK CIZER-0130P | | | | 5 | | | | | |
| | Organic peroxide | | PERHEXA 25B | 0.05 | 0.05 | 0.05 | 0.05 | 0.0045 | 0.05 | 0.05 | 0.15 | 0.1 |
| | Inorganic filler | Hydrotalcite | DHT4A | 4 | 4 | 1.5 | 4 | 4 | 4 | 4 | 4 | 4 |
| | | Magnesium hydroxide | KISUMA 5L | 60 | 60 | | 60 | 60 | 50 | 40 | 50 | 250 |
| | | Silica | CRYSTALITE 5X | | | | 10 | | | | | |
| | | Calcium carbonate | SOFTON 2200 | | | | | | | | 80 | 100 |
| | | Silica | Aerosil 200 | | 2 | 0.2 | | 1 | 1 | 1 | 1 | |

TABLE 1-continued

|  |  |  |  | Example |  |  |  |  |  |  |  |  |
|---|---|---|---|---|---|---|---|---|---|---|---|---|
|  |  |  |  | 1 | 2 | 3 | 4 | 5 | 6 | 7 | 8 | 9 |
|  | Silane coupling agent | Vinyltrimethoxysilane Vinyltriethoxysilane | KBM-1003 KBE-1003 | 5 | 12 | 2.5 | 8 | 8 | 2.5 | 8 | 7 | 15 |
| Catalyst MB | Carrier resin | Chlorinated polyethylene | ELASLEN 402NA-X5 | 10 | 10 | 10 | 10 | 10 | 10 | 10 | 10 | 10 |
|  | Silanol condensation catalyst | Dioctyltin dilaurate | ADKSTAB OT-1 | 0.05 | 0.05 | 0.05 | 0.05 | 0.05 | 0.05 | 0.05 | 0.05 | 0.05 |
|  | Antioxidizing agent |  | IRGANOX 1010 | 0.1 | 0.1 | 0.1 | 0.1 | 0.1 | 0.1 | 0.1 | 0.1 | 0.1 |
| Evaluations |  | Heat deformation test |  | 30 | 24 | 45 | 34 | 47 | 42 | 28 | 27 | 18 |
|  |  | Hot set test |  | A | A | A | A | A | A | A | A | A |
|  |  | Extrusion outer appearance |  | A | A | B | A | A | B | B | A | A |

TABLE 2

|  |  |  |  | Example |  |  | Comparative example |  |  |  |  |  |
|---|---|---|---|---|---|---|---|---|---|---|---|---|
|  |  |  |  | 10 | 11 | 12 | 1 | 2 | 3 | 4 | 5 | 6 |
| Silane MB | Halogen-containing resin | Chlorinated polyethylene | ELASLEN 401A | 80 |  |  |  |  |  |  |  |  |
|  |  | Chlorinated polyethylene | ELASLEN 402NA-X5 |  | 90 |  | 90 | 90 | 90 | 90 | 90 | 90 |
|  |  | Chlorinated polyethylene | ELASLEN 351A |  |  |  |  |  |  |  |  |  |
|  |  | Chlorinated polyethylene | ELASLEN 353 |  |  |  |  |  |  |  |  |  |
|  |  | PVC | ZEST 1000 |  |  |  |  |  |  |  | 50 |  |
|  |  | Chloroprene rubber | SKYPRENE E-33 |  |  |  |  |  |  |  |  |  |
|  |  | Fluorocarbon rubber | AFLAS 150P |  |  | 90 |  |  |  |  |  |  |
|  |  | Trimellitic acid-based plasticizer | TRIMEX N-08 |  |  |  |  |  |  |  |  |  |
|  |  | Epoxidized soybean oil | ADK CIZER-0130P |  |  |  |  |  |  |  | 10 |  |
|  | Organic peroxide |  | PERHEXA 25B | 0.05 | 0.04 | 0.28 | 0.4 | 0.001 | 0.05 | 0.05 | 0.05 | 0.05 |
|  | Inorganic filler | Hydrotalcite | DHT4A | 4 | 4 | 4 | 4 | 4 | 0.2 | 4 | 4 | 4 |
|  |  | Magnesium hydroxide | KISUMA 5L |  |  |  |  | 60 | 60 |  | 300 | 100 | 100 |
|  |  | Silica | CRYSTALITE 5X | 40 |  | 65 |  |  |  |  |  |  |
|  |  | Calcium carbonate | SOFTON 2200 |  | 50 | 20 |  |  |  | 150 |  |  |
|  |  | Silica | Aerosil 200 | 2 | 4 | 5 |  |  |  |  |  |  |
|  | Silane coupling agent | Vinyltrimethoxysilane Vinyltriethoxysilane | KBM-1003 KBE-1003 | 7 | 14 | 7 | 5 | 5 | 5 | 7 | 16 4 | 1 |
| Catalyst MB | Carrier resin | Chlorinated polyethylene | ELASLEN 402NA-X5 | 10 | 10 | 10 | 10 | 10 | 10 | 10 | 10 | 10 |
|  | Silanol condensation catalyst | Dioctyltin dilaurate | ADKSTAB OT-1 | 0.05 | 0.05 | 0.05 | 0.05 | 0.05 | 0.05 | 0.05 | 0.05 | 0.05 |
|  | Antioxidizing agent |  | IRGANOX 1010 | 0.1 | 0.1 | 0.1 | 0.1 | 0.1 | 0.1 | 0.1 | 0.1 | 0.1 |
| Evaluations |  | Heat deformation test |  | 38 | 32 | 22 | Could not formed | 84 | 63 | 55 | 48 | 88 |
|  |  | Hot set test |  | A | A | A |  | C | C | C | C | C |
|  |  | Extrusion outer appearance |  | A | A | B | C | A | C | C | C | C |

As is apparent from the results shown in Tables 1 and 2, all Examples 1 to 12 passed the heat deformation test and the hot set test. Thus, according to the present invention, the electric wires having the crosslinked resin formed bodies which were excellent in heat resistance and were not melted even at a high temperature, as the coatings, were able to be produced. Further, the electric wires in Examples 1 to 12 passed also the outer appearance test, and the electric wires having the crosslinked formed bodies having excellent outer appearance as the coatings were able to be produced.

In contrast, in Comparative Example 1 in which the content of the organic peroxide was excessively large, even extrusion forming was unable to be performed. Comparative Example 2 in which the content of the organic peroxide was excessively small, failed to pass both the heat deformation test and the hot set test. Even when the content of the inorganic filler was excessively small (Comparative Example 3) or when the content of the inorganic filler was excessively large (Comparative Example 4), these examples failed to pass the heat deformation test and the hot set test.

Comparative Example 5 in which the content of the silane coupling agent was excessively large, failed to pass the hot set test, and Comparative Example 6 in which the content of the silane coupling agent was excessively small, failed to pass even the heat deformation test.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A method for producing a heat-resistant crosslinked resin formed body, comprising:
    (a) melt-kneading 0.003 to 0.3 part by mass of an organic peroxide, 0.5 to 400 parts by mass of an inorganic filler, and more than 2 parts by mass and 15.0 parts by mass or less of a silane coupling agent, with respect to 100 parts by mass of a resin containing a halogen-containing resin, at a temperature equal to or higher than a decomposition temperature of the organic peroxide, to prepare a silane master batch;
    (b) mixing the silane master batch obtained in the step (a) with a silanol condensation catalyst, and then forming the resultant mixture; and
    (c) bringing the formed body obtained in the step (b) into contact with moisture, to cause crosslinking.

2. The method for producing the heat-resistant crosslinked resin formed body described in claim 1, wherein a content of the organic peroxide is 0.005 to 0.1 part by mass.

3. The method for producing the heat-resistant crosslinked resin formed body described in claim 1, wherein a content of the silane coupling agent is 3 to 12.0 parts by mass.

4. The method for producing the heat-resistant crosslinked resin formed body described claim 1, wherein a content of the silane coupling agent is 4 to 12.0 parts by mass.

5. The method for producing the heat-resistant crosslinked resin formed body described in claim 1, wherein the silane coupling agent is vinyltrimethoxysilane or vinyltriethoxysilane.

6. The method for producing the heat-resistant crosslinked resin formed body described in claim 1, wherein the inorganic filler is silica, aluminum hydroxide, magnesium hydroxide, calcium carbonate or antimony trioxide, or any combination of these.

7. The method for producing the heat-resistant crosslinked resin formed body described in claim 1, wherein melt-kneading in the step (a) is performed by using an enclosed mixer.

8. A silane master batch for use in producing a master batch mixture prepared by mixing 0.003 to 0.3 part by mass of an organic peroxide, 0.5 to 400 parts by mass of an inorganic filler, and more than 2 parts by mass and 15.0 parts by mass or less of a silane coupling agent, with respect to 100 parts by mass of a resin containing a halogen-containing resin, and a silanol condensation catalyst,
    wherein the silane master batch is obtained by melt-kneading all or part of the resin; the organic peroxide, the inorganic filler and the silane coupling agent, at a temperature equal to or higher than a decomposition temperature of the organic peroxide.

9. A master batch mixture, comprising the silane master batch described in claim 8 and a silanol condensation catalyst.

10. A formed body, formed by introducing the master batch mixture obtained by dry-blending the silane master batch described in claim 8 and a silanol condensation catalyst, into a forming machine.

11. A heat-resistant crosslinked resin formed body, produced according to the method for producing the heat-resistant crosslinked resin formed body described in claim 1.

12. The heat-resistant crosslinked resin formed body described in claim 11, formed by crosslinking the halogen-containing resin with the inorganic filler through a silanol bond.

13. A heat-resistant product, comprising the heat-resistant crosslinked resin formed body described in claim 11.

14. The heat-resistant product described in claim 13, wherein the heat-resistant crosslinked resin formed body is a coating of an electric wire or an optical fiber cable.

* * * * *